(12) United States Patent
James

(10) Patent No.: US 9,501,526 B2
(45) Date of Patent: Nov. 22, 2016

(54) EFFICIENT DATABASE SEARCHING

(71) Applicant: Yahoo! Inc., Sunnyvale, CA (US)

(72) Inventor: Rick James, Los Altos, CA (US)

(73) Assignee: Excalibur IP, LLC, Sunnyvale, CA (US)

( * ) Notice: Subject to any disclaimer, the term of this patent is extended or adjusted under 35 U.S.C. 154(b) by 163 days.

(21) Appl. No.: 13/865,082

(22) Filed: Apr. 17, 2013

(65) Prior Publication Data

US 2014/0317086 A1    Oct. 23, 2014

(51) Int. Cl.
*G06F 17/30* (2006.01)

(52) U.S. Cl.
CPC .............................. *G06F 17/30442* (2013.01)

(58) Field of Classification Search
CPC ................................................ G06F 17/30442
USPC ........................................................ 707/715
See application file for complete search history.

(56) References Cited

U.S. PATENT DOCUMENTS

| | | | |
|---|---|---|---|
| 6,161,105 A * | 12/2000 | Keighan et al. | |
| 6,223,182 B1 * | 4/2001 | Agarwal et al. | |
| 6,484,179 B1 * | 11/2002 | Roccaforte | 707/737 |
| 6,778,996 B2 * | 8/2004 | Roccaforte | 707/600 |
| 6,901,536 B2 * | 5/2005 | Davenport | 714/39 |
| 7,035,869 B2 * | 4/2006 | Smartt | |
| 8,090,730 B2 * | 1/2012 | Shahabi et al. | 707/756 |
| 8,447,320 B2 * | 5/2013 | Patel et al. | 455/456.1 |
| 8,650,220 B2 * | 2/2014 | Rohlf et al. | 707/797 |
| 2003/0033273 A1 | 2/2003 | Wyse | |
| 2006/0058958 A1 | 3/2006 | Galbreath et al. | |
| 2006/0282455 A1 * | 12/2006 | Lee et al. | 707/102 |
| 2007/0016562 A1 | 1/2007 | Cooper | |
| 2007/0061365 A1 * | 3/2007 | Giegerich et al. | 707/104.1 |
| 2008/0046997 A1 * | 2/2008 | Wang | 726/16 |
| 2009/0222440 A1 * | 9/2009 | Hantke et al. | 707/5 |
| 2009/0327071 A1 * | 12/2009 | Kreft | 705/14.49 |
| 2010/0205040 A1 * | 8/2010 | Wiederstein | 705/10 |
| 2011/0029557 A1 * | 2/2011 | Raghavan | G06F 17/30492 707/769 |
| 2011/0072005 A1 | 3/2011 | Vechersky | |
| 2012/0109888 A1 * | 5/2012 | Zhang | G06F 17/30584 707/610 |
| 2012/0109944 A1 | 5/2012 | Hao | |
| 2013/0110819 A1 * | 5/2013 | Attaluri | G06F 17/30492 707/714 |
| 2013/0151491 A1 * | 6/2013 | Gislason | G06F 17/30339 707/696 |

OTHER PUBLICATIONS

Hörhammer, Mike, et al., "Spatial Indexing with a Scale Dimension", SSD '99, LNCS 1651, Springer-Verlag, Berlin, Germany, © 1999, pp. 52-71.*

(Continued)

*Primary Examiner* — Robert Stevens
(74) *Attorney, Agent, or Firm* — Brinks Gilson & Lione

(57) ABSTRACT

Systems and methods are disclosed for efficiently searching a database including a table. The table is partitioned along a first dimension, such as latitude. Indexes in each of the partitions are built along a second dimension, such as longitude. The table may also be clustered according to an index to improve performance. When a processor receives a database query term and a starting location, the processor selects, from the table, a data partition within a first offset to the starting location along the first dimension. The processor selects, from the selected data partition, a first number of first data records related to the query term and within a second offset to the starting location along the second dimension.

18 Claims, 4 Drawing Sheets

(56) References Cited

OTHER PUBLICATIONS

Song, Jie, et al., "Partitioned Dimension: Modeling the Numerical Dimension in Data Warehouse", APWEB 2010, Busan, South Korea, Apr. 6-8, 2010, pp. 330-336.*

Wan, Bo, et al., "Combination of Partition Table and Grid Index in Large-Scale Spatial Database Query", ICISE 2009, Nanjing, China, Dec. 26-28, 2009, pp. 2007-2011.*

Wu, Eugene, et al., "Partitioning Techniques for Fine-grained Indexing", ICDE 2011, Hannover, Germany, Apr. 11-16, 2011, pp. 1127-1138.*

Madria, Sunjay Kumar, et al., "Data Organization Issues for Location-dependent Queries in Mobile Computing", Computer Science Technical Reports, Paper 1468, Dept. of Computer Science, Perdue University, © 1999, pp. 367-375.*

Microsoft Computer Dictionary, 5th Edition, Microsoft Press, Redmond, WA, © 2002, pp. 141 and 442-443.*

Tatarowicz, Aubrey L., et al., "Lookup Tables: Fine-Grained Partitioning for Distributed Databases", ICDE 2012, Washington, DC, Apr. 1-5, 2012, pp. 102-113.*

Liao, Haojun, et al., "Multi-dimensional Index on Hadoop Distributed File System", NAS 2010, Macau, Jul. 15-17, 2010, Macau, pp. 240-249.*

Silberstein, Adam, et al., "Efficient Bulk Insertion into a Distributed Ordered Table", SIGMOD '08, Vancouver, BC, Canada, Jun. 9-12, 2008, pp. 765-778.*

Microsoft Computer Dictionary, 5th Edition, Microsoft Press, Inc., Redmond, WA, © 2002, pp. 269-270.*

"Database Index", Wikipedia, downloaded from: en.wikipedia.org/wiki/Database_index, Mar. 21, 2016, pp. 1-7.*

ISR to PCT/US2014/032549 dated Aug. 25, 2014 (3p).

* cited by examiner

EFFICIENT DATABASE SEARCHING

FIELD

This disclosure is related to database searching. More particularly, it relates to methods and systems for efficient database searching.

BACKGROUND

Location-based services (LBS) are a general class of computer program-level services used to include specific controls for location and time data as control features in computer programs. Recently, LBS find more and more applications in social networking as an entertainment service, which is accessible with mobile devices through the mobile network and which uses information on the geographical position of the mobile device. Location related services have become more and more popular with the expansion of the smartphone and tablet markets as well.

LBS may be used in a variety of contexts, such as health, indoor object search, entertainment, work, personal life, etc. LBS include services to identify a location of a person or object, such as discovering the nearest banking cash machine (ATM) or the whereabouts of a friend or employee. LBS include parcel tracking and vehicle tracking services. LBS can include mobile commerce when taking the form of coupons or advertising directed at customers based on their current locations. The LBS services may even include personalized weather services and location-based games. They are an example of telecommunication convergence, or the coming together of previously distinct media such as telephony and data communications into common interfaces on single devices.

SUMMARY

A variety of exemplary embodiments are described generally herein. Expressly disclosed embodiments store data in partitions and search the nearest partitions within a preset distance from a starting point. Performance of LBS may be improved by ordering the layout of the database to two tables, partitioning the first table along a first dimension, indexing along a second dimension, or clustering based on an index. These techniques lead to efficient loading of only one, or a small number of, blocks to retrieve the desired data from the storage system, reducing latency, and improving the overall quality of the experience for end users of LBS.

A first embodiment comprises a computer system for a processor having access to a database. The database includes a first table of data records including: a first data partition and a second data partition. The first data partition is associated with a first range in a first dimension and is further associated with a first index in a second dimension. The second data partition is associated with a second range in the first dimension and is further associated with a second index in the second dimension.

A second embodiment provides a device including a processor having access to a database in the above embodiment. In this example, the processor is configured to receive a query term and a starting location. The processor is configured to select, from the first table, a data partition within a first offset to the starting location along the first dimension. The processor is configured to select, from the selected data partition, a first number of first data records related to the query term and within a second offset to the starting location along a second dimension. Other exemplary systems may include other or additional or fewer records which cooperate in a different manner but which achieve the same beneficial effects.

Another embodiment discloses a computer implemented method or program. In this embodiment, the computer implemented method includes the following steps. First, a processor receives a request to access a database in the first embodiment. The request includes query term and a starting location. Second, the processor selects a data partition from the first table within a first offset to the starting location along the first dimension. Third, the processor selects, from the selected data partition, a first number of first data records related to the query term and within a second offset to the starting location along a second dimension. Other exemplary methods may include other or additional or fewer steps, and the ordering of the steps may be changed is appropriate.

DETAILED DESCRIPTION OF THE DRAWINGS

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

In a computer system, applications that may need to find the N geographically "nearest" items of a given type suffer from inefficient search techniques. For example, in an LBS device or system, a web user or smart phone user may want to find the 10 nearest restaurant close to his location. This disclosure describes a novel way to make such searches efficient even for large datasets.

Figure 1:
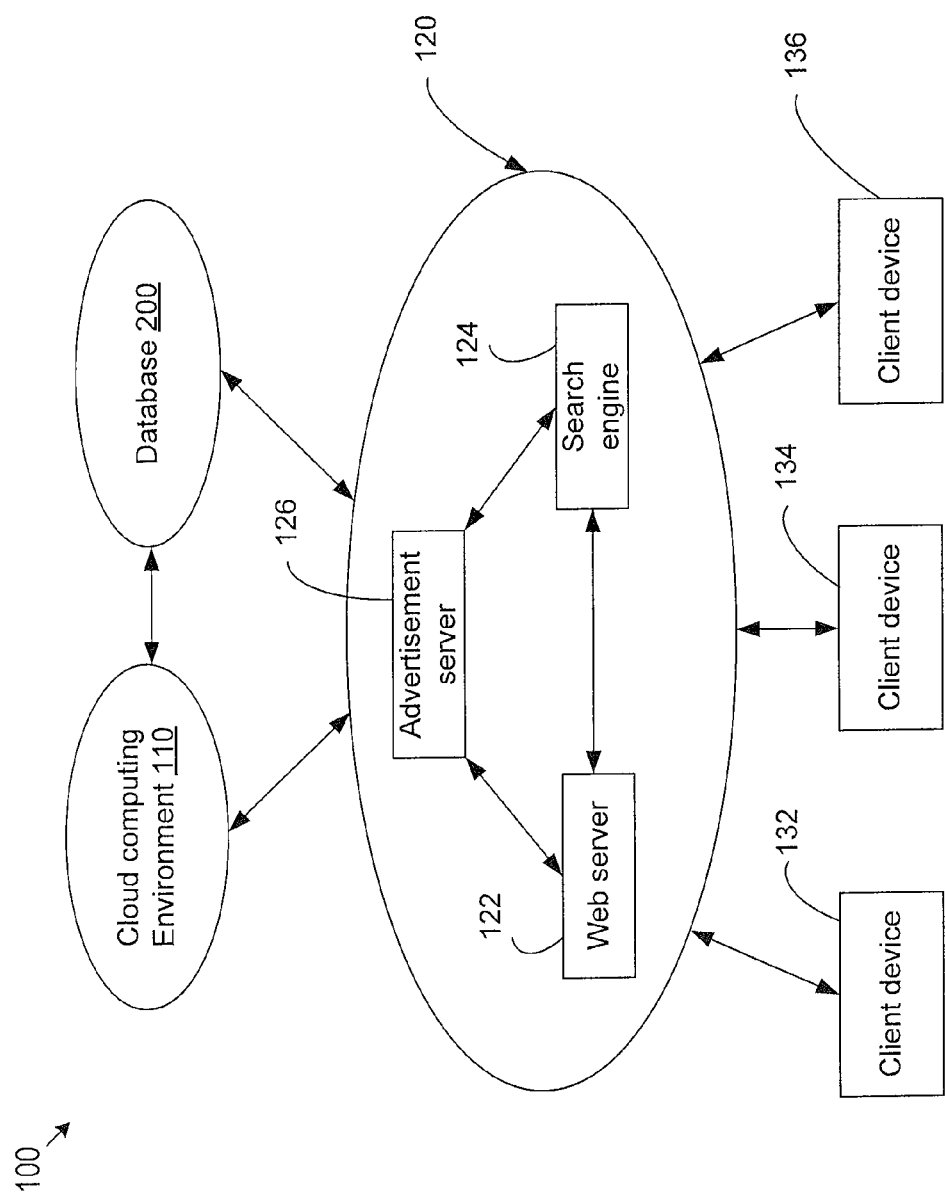
FIG. 1 shows an example block diagram of one embodiment of an environment in which a system for selecting data records in a database.

FIG. 1 shows an example block diagram of one embodiment of an environment 100 in which a system for selecting data records in a database.

The environment 100 may include a cloud computing environment 110 and a connected server system 120 including a web server 122, a search engine 124, and an advertisement server 126. The disclosed method and system may be implemented in the cloud computing environment 110 or the server system 120. A server may include a computing device may be capable of sending or receiving signals, such as via a wired or wireless network, or may be capable of processing or storing signals, such as in memory as physical memory states. Thus, a server device may include, as examples, dedicated rack-mounted servers, desktop computers, laptop computers, set top boxes, integrated devices combining various features, such as two or more features of the foregoing devices, or the like.

Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

The web server 122 may be a computer, a server, or any other computing device known in the art, or the web server 122 may be a computer program, instructions, and/or software code stored on a computer-readable storage medium that runs on a processor of a single server, a plurality of servers, or any other type of computing device known in the art. The web server 122 delivers content, such as a web page, using the Hypertext Transfer Protocol and/or other protocols. The web server 122 may also be a virtual machine running a program that delivers content. For example, the web server 122 may be configured to provide LBS to any web users. However, it should be appreciated that the systems and methods described below are not limited to use with a web server.

The search engine 124 may be a computer system, one or more servers, or any other computing device known in the art, or the search engine 124 may be a computer program, instructions, and/or software code stored on a computer-readable storage medium that runs on a processor of a single server, a plurality of servers, or any other type of computing device known in the art. The search engine 124 may be designed to help users find information located on the Internet or an intranet. In addition, the search engine 124 may also provide LBS to anyone if certain search queries are received.

The advertisement server 126 may be a computer system, one or more servers, or any other computing device known in the art, or the advertisement server 126 may be a computer program, instructions and/or software code stored on a computer-readable storage medium that runs on a processor of a single server, a plurality of servers, or any other type of computing device known in the art. The advertisement server 126 may be designed to provide digital ads to a web user based on display conditions requested by the advertiser. The advertisement server 126 may be configured to provide LBS related ads when a location related webpage is displayed or a location related search query is received by the search engine 124.

The cloud computing environment 110 and the connected server system 120 have access to a database 200. The database 200 includes information related to different objects in a certain geographic region. The objects may be one of the following: an organization, a person, a business, a landmark, a building, or anything of interest to a user. The information in the database 200 includes locations and services, or any other useful information. For example, the database 200 may include business names, business locations, and service information of a restaurant. The database 200 may further include promotions, coupons, or any other information of an object.

The environment 100 may further include a plurality of client devices 132, 134, and 136. The client device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like.

The client device may vary in terms of capabilities or features. For example, a cell phone may include a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) or other location identifying type capability, or a display with a high degree of functionality, such as a touch-sensitive color 2D or 3D display, for example.

The client device may include or may execute a variety of operating systems, including a personal computer operating system, such as a Windows, iOS or Linux, or a mobile operating system, such as iOS, Android, or Windows Mobile, or the like. A client device may include or may execute a variety of possible applications, such as a client software application enabling communication with other devices, such as communicating one or more messages, such as via email, short message service (SMS), or multimedia message service (MMS), including via a network, such as a social network, including, for example, Facebook, LinkedIn, Twitter, Flickr, or Google-F, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

Generally, a web user or any other user may use a client device to access information on the server system 120. For example, an advertiser may purchase digital ads based on an auction model of buying ad space or a guaranteed delivery model by which an advertiser pays a minimum cost per thousand ads displayed ("CPM") to display the digital ad. When a user click on the digital ad, the client device may load a web page related to the advertiser.

For example, when an Internet user utilizes one of the client devices 132, 134, 136 to submit a search query to the search engine 124, the search engine 124 may return a plurality of search results to the Internet user. The advertisement server 126 may additionally serve one or more digital ads to the Internet user based on search terms provided by the Internet user. In addition or alternatively, when an Internet user utilizes one of the client devices 132, 134, 136 to view a website served by the web server 122, the advertisement server 126 may serve one or more digital ads to the Internet user based on keywords obtained from the content of the website. The disclosed method may also apply to displaying ads on webpages, in games, or in any other situations or platforms with the need to display ads to potential customers.

Figure 2:
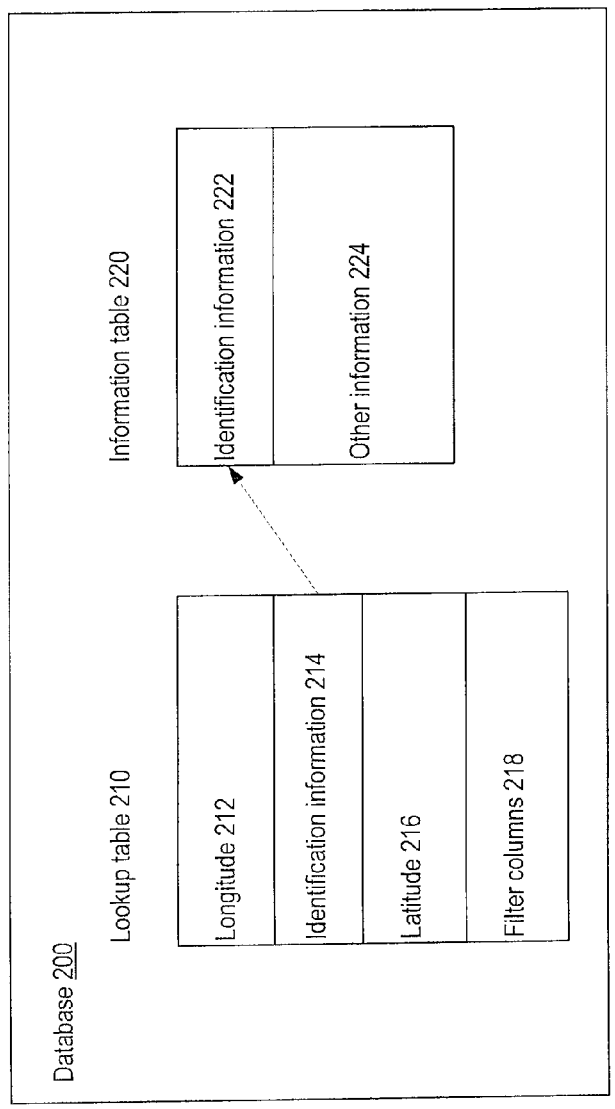
FIG. 2 illustrates an example of a database according to an embodiment of the disclosure.

FIG. 2 illustrates an example of a database 200 according to an embodiment of the disclosure. A database may be optimized to offer an organized mechanism for storing, managing and retrieving information related to different objects in a certain geographic region. For example, the database may include different attributes related to organizations, people, businesses, landmarks, buildings, or anything of interest to a user in the United States. The database may include a plurality of tables. Each table includes rows and columns. Each row may correspond to an object and each column may include a type of attribute of different objects. However, it should be understood that the database may be organized in other ways known in the art.

In FIG. 2, the database 200 includes two tables: a lookup table 210 and an information table 220. The lookup table 210 includes a plurality of data records corresponding to different objects. Each data record in the lookup table 210 includes at least one of the four attributes of an object: the longitude 212, the identification information 214, the latitude 216, and the filter columns 218. The database 200 given here is only for illustration, the database 200 may include any LBS data.

The lookup table 210 may be partitioned along a first coordinate on a first dimension. For example, the table 210 may be partitioned along latitude, longitude, or more generally along any dimension defined within a coordinate system, either Euclidean or curvilinear. When the table 210 is partitioned along the latitude, each partition includes data records near a particular latitude. For example, each partition may include a small range near a latitude (e.g. 20±1°).

The lookup table 210 includes a first primary key that combines the longitude information, the identification information, and the latitude information. The primary key is designed to uniquely identify a row in a table. In one embodiment, the longitude information in the first primary key is stored first so that the data records in the lookup table can be easily clustered using the longitude information. The latitude information in the first primary key may be used to identify the partition key. The identification information in the first primary key guarantees that each first primary key is unique in the lookup table 210. There the latitude information and the identification information can be stored in any order after the longitude information in the first primary key.

The information table 220 includes a plurality of data records corresponding to different objects. Each data record in the information table 220 includes identification information 222 and other information 224. The identification information 222 in the information table 220 matches the identification information 214 in the lookup table 210. The matching identification information 214 and 222 may include unique identification related to an object such as a unique account number, a tax identification, or any other unique identification.

Figure 3:
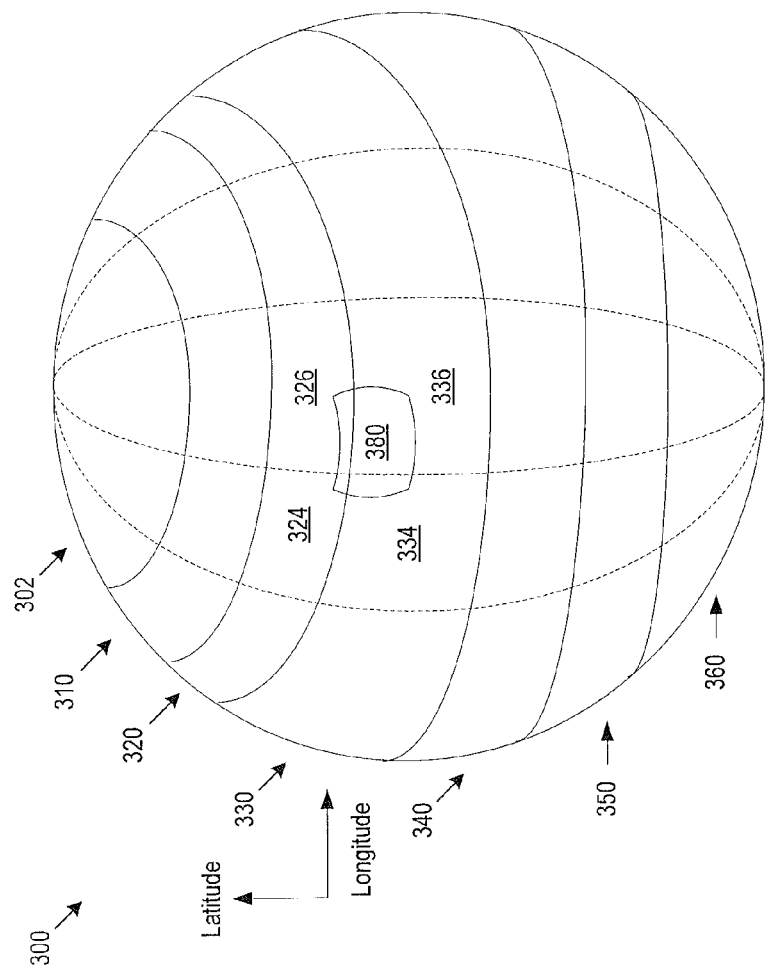
FIG. 3 illustrates an example of partitions in a first table according to an embodiment of the disclosure.

FIG. 3 illustrates an example of how partitions are made in a table 300 according to an embodiment of the disclosure. The table 300 may include data records on the earth. The table 300 is sliced up to a plurality of partitions along the latitude. For example, the table 300 may be sliced up to 90 partitions with 2 degree in each partition. The table 300 may also be sliced up to 50 to 100 partitions with each partition having similar population size. Note that the table 300 may be any LBS data.

In FIG. 3, the table 300 includes a plurality of partitions: 302, 310, 320, 330, 340, 350, and 360. Each data partition may be indexed using ordinary indexing along the longitudes.

In one embodiment, MySQL® may be used to implement the disclosed method and system. MySQL® is a relational database management system (RDBMS), and ships with no GUI tools to administer MySQL® databases or manage data contained within the databases. In MySQL®, a PARTITION feature may distribute portions of individual tables across a file system according to preset rules. In effect, different portions of a table are stored as separate tables in different locations on the data storage system. Following shows an example of using the PARTITION feature in MySQL® to slice the database.

First, to get to a data type that can be used in PARTITION, the latitude and longitude need to be scaled. In one example, the latitude and longitude are multiplied by 100, rounded, and stored into an integer format such as SMALLINT format in MySQL®. That will take 2 bytes for each geographic coordinate dimension, for a total of 4 bytes. Accordingly, two locations that are separated within a mile apart may be registered as having the same latitude and longitude.

In a second example, DECIMAL(4,2) is adopted for Latitude and DECIMAL(5,2) is adopted for Longitude. The data type DECIMAL(A,B) in MySQL® defines a data type where A is the maximum number of digits and B is the number of digits to the right of the decimal point. The latitude and longitude take 2+3 bytes and have no better resolution than the first example.

In a third example, SMALLINT scaled is adopted that converts Latitude into a SMALLINT SIGNED by scaling (degrees/90*32767) and rounding converts Longitude into a SMALLINT SIGNED by scaling (degrees/180*32767).

Other scaling factors such as 1000 or 10000 may also be adopted. The scaling factor may be chosen to meet the specific application requirement and other performance considerations.

In FIG. 3, a user in the area 380 may send a query to a computer system to find the N nearest pizza parlors near a starting location including a latitude and a longitude of the location, for example. Note that the area 380 is for illustration only, the exact area of the area may be a square or any other shape. The computer system may first select a partition 330 based on the latitude information of the starting location. The computer system then selects data records in the region 336 based on the latitude information of the starting location. If the total number of pizza parlors in the region 336 is less than N, the computer system may need to look for more pizza parlors in one or more of the neighboring regions: 324, 326, and 334. The computer system will stop searching the table 300 when the N pizza parlors are identified or when the computer system has checked all the data records within a preset max distance to the starting location.

Figure 4:
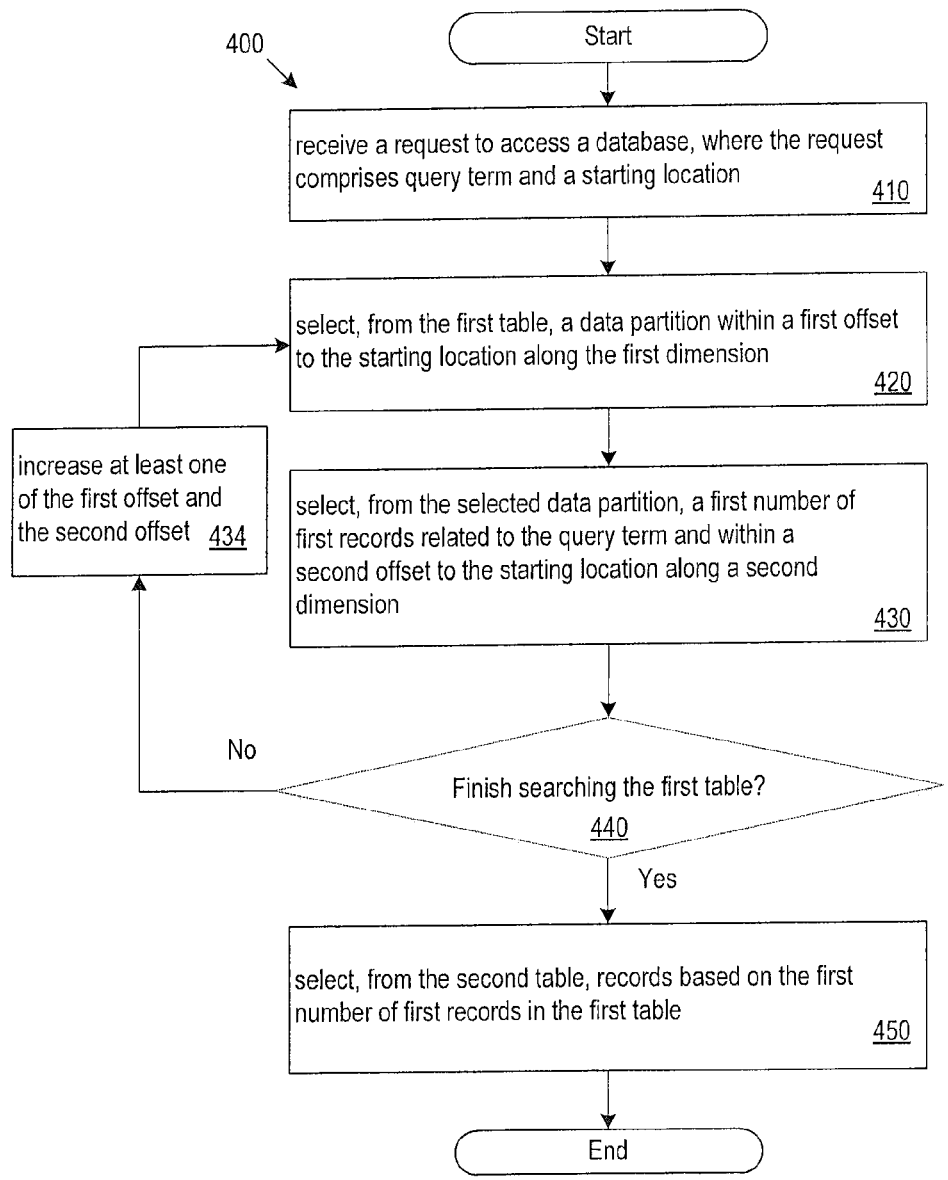
FIG. 4 shows an example of a method for selecting data records in a database.

FIG. 4 shows an example of a method 400 for selecting data records in a database described above. The method may be implemented in a computer system having access to the database. The computer system may include any server in the server system 120 or the cloud computing environment 110 in FIG. 1. The computer system includes computer servers with processors and computer readable media such as hard disk, computer memory, or other data storage hardware. A computer implemented method in the computer system may include the following steps. Other steps may be added or substituted.

In step 410, the computer system receives a request to access the database. The request includes a query term and a starting location. The request may further include filter conditions to further limit the service or other aspects of the desired data records. The database includes a first table and a second table including data records having matching identification information. The first table includes data partitions along a first geographic coordinate. In an embodiment, the two tables may be 1:1, that is, they have matching rows. The first table may be smaller than the second table due to the columns involved. And the first table is efficiently searched because the method uses the data clustering to its advantage. This keeps the number of disk operations down. The second table includes the information to be display or delivered to the user, so the bulkiness is a decision related to business considerations.

In step 420, the computer system selects, from the database, a data partition within a first offset to the starting location along the first geographic coordinate. This may be implemented in a server computer using the PARTITION Pruning in MySQL®. The first geographic coordinate may be latitude, longitude, or more generally along any dimension defined within a coordinate system, either Euclidean or curvilinear. Preferably, the first geographic coordinate is the latitude.

In step 430, the computer system selects, from the first table in the selected data partition, a first number of first data records related to the query term and within a second offset to the starting location along a second geographic coordinate. The step may touch more data records than will show up in the end result. In that case, only the desired number of identifications are delivered to the next step.

The first table includes a first primary key including the first geographic coordinate, the second geographic coordinate, and the matching identification information. For example, the first primary key may include three data fields in three columns. The second table includes a second primary key comprising the matching identification information.

The computer system may need to scale at least one of the first and second geographic coordinates according to a preset resolution. This step is optional and it may be necessary in MySQL®. Generally, the smaller the resolution, the larger the scaling factor is adopted.

After the computer system finish searching the data records in the square region (e.g. region 336), the computer system determines whether it should finish searching the first table in step 440. For example, the computer system may finish searching when one of the following finishing search condition is met: 1) the desired number of records (e.g. N records) is found or 2) when it reached a maximum allowed distance from the starting point. Other reasonable finishing condition may be introduced based on specific application. If the computer system found less than N records, the computer system increases at least one of the first and second offsets and repeats the selections in a larger region in step 434. The larger region may include an area which has the twice the area of region 336. The computer system then loops over the steps of 420 and 430 until the finishing searching condition is met.

In step 450, the computer system selects, from the second table in the selected data partition, a second number of second data records based on the first number of first data records in the first table. In this step, the computer system looks up the matching identification information in the second table based on the selected data records in step 430. In one embodiment, the computer system only accesses the second table when a desired number of data records are found in the first table. The second table may further include desired information about the Pizza parlors including: address, phone number, etc.

After N data records are identified or when a maximum distance from the starting point has been searched, the computer system delivers the selected data records to the user client device. The parameter N may be received from the client device or preset by the computer system. Following shows an example of an implementation of the disclosed method using MySQL®.

```
CREATE PROCEDURE FindNearest (
    IN _my_lat DOUBLE, -- Latitude of me [-90..90] (not scaled)
    IN _my_lon DOUBLE, -- Longitude [-180..180]
    IN _max_dist DOUBLE, -- Limit how far to search: miles or km
    IN _limit INT, -- How many items to try to get
    IN _condition VARCHAR(1111) -- ANDed; restricted to *Locations* fields
)
DETERMINISTIC
BEGIN
    -- lat and lng are in degrees -90..+90 and -180..+180
    -- All computations done in Latitude degrees.
    -- Thing to tailor
    -- *id* = column that JOINs *Locations* and *Info*
    -- *Locations*, *Info* -- the two tables
    -- Scaling of lat, lon; here using *10000 in MEDIUMINT
        -- Table name
        -- Hardcoded constant:
    DECLARE _deg2rad DOUBLE DEFAULT PI( )/1800000;
    -- For scaled by 1e4 to MEDIUMINT
    -- Cannot use params in PREPARE, so switch to @variables:
    -- Hardcoded constant:
    SET @my_lat := _my_lat * 10000,
        @my_lon := _my_lon * 10000,
        @deg2dist := 0.0069172, -- 69.172 for miles; 111.325 for km
        @start_deg := 15 / @deg2dist, -- Start with this radius first (15 miles)
        @max_deg := _max_dist / @deg2dist,
        @cutoff := @max_deg / SQRT(2), -- (slightly pessimistic)
        @dlat := @start_deg, -- note: must stay positive
        @lon2lat := COS(_deg2rad * @my_lat),
        @iterations := 0;    -- just debugging
        -- Loop through, expanding search
    -- Search a 'square', repeat with bigger square until find enough rows
    -- If the inital probe found _limit rows, then probably the first
    -- iteration here will find the desired data.
    -- Hardcoded table name:
    SET @sql = CONCAT(
       "SELECT COUNT(*) INTO @near_ct
           FROM cities6
           WHERE lat BETWEEN @my_lat - @dlat
             AND @my_lat + @dlat
    -- PARTITION Pruning and bounding box
             AND lon BETWEEN @my_lon - @dlon
             AND @my_lon + @dlon -- first part of PK
             AND ", _condition);
    PREPARE _sql FROM @sql;
       MainLoop: LOOP
       SET @iterations := @iterations + 1;
       -- The main probe: Search a 'square'
       SET @dlon := ABS(@dlat / @lon2lat); -- good enough for now
       -- note: must stay positive
       -- Hardcoded constants:
       SET @dlon := IF(ABS(@my_lat) + @dlat >= 900000, 3600001,
          @dlon);
    -- near a Pole
       EXECUTE _sql;
       IF ( @near_ct >= _limit OR    -- Found enough
           @dlat >= @cutoff ) THEN   -- Give up (too far)
           LEAVE MainLoop;
       END IF;
       -- Expand 'square':
```

```
    SET @dlat := LEAST(2 * @dlat, @cutoff); -- Double the radius to
search
    END LOOP MainLoop;
    DEALLOCATE PREPARE _sql;
        -- Out of loop because found _limit items, or going too far.
    -- Expand range by about 1.4 (but not past _max_dist),
    -- then fetch details on nearest 10.
    -- Hardcoded constant:
    SET @dlat := IF( @dlat >= @max_deg OR @dlon >= 1800000,
        @max_deg,
            GCDist(ABS(@my_lat), @my_lon,
                ABS(@my_lat) - @dlat, @my_lon - @dlon) );
        -- ABS: go toward equator to find farthest corner (also avoids poles)
        -- Dateline: not a problem (see GCDist code)
        -- Reach for longitude line at right angle:
    -- sin(dlon)*cos(lat) = sin(dlat)
    -- Hardcoded constant:
    SET @dlon := IFNULL(ASIN(SIN(_deg2rad * @dlat /
                COS(_deg2rad * @my_lat))
                / _deg2rad -- precise
            , 3600001);  -- must be too near a pole
    -- Hardcoded constants:
    IF (ABS(@my_lon) + @dlon < 1800000 OR
    -- Usual case - not crossing dateline
        ABS(@my_lat) + @dlat < 900000) THEN
    -- crossing pole, so dateline not an issue
    -- Hardcoded table name:
            SET @sql = CONCAT(
            "SELECT*,
                @deg2dist * GCDist(@my_lat, @my_lon, lat, lon) AS dist
            FROM cities6
            WHERE lat BETWEEN @my_lat - @dlat
                AND @my_lat + @dlat
    -- PARTITION Pruning and bounding box
                AND lon BETWEEN @my_lon - @dlon
                    AND @my_lon + @dlon    -- first part of PK
                AND ", _condition, "
            HAVING dist <= ", max dist, "
            ORDER BY dist
            LIMIT ", _limit
                );
        PREPARE _sql FROM @sql;
        EXECUTE _sql;
        DEALLOCATE PREPARE _sql;
            ELSE
    -- Hardcoded constants and table name:
    -- Circle crosses dateline, do two SELECTs, one for each side
        SET @west_lon := IF(@my_lon < 0, @my_lon, @my_lon -
3600000);
        SET @east_lon := @west_lon + 3600000;
    -- One of those will be beyond +/- 180; this gets points beyond the
dateline
            SET @sql = CONCAT(
            "( SELECT*,
                @deg2dist * GCDist(@my_lat, @west_lon, lat, lon) AS dist
            FROM cities6
            WHERE lat BETWEEN @my_lat - @dlat
                AND @my_lat + @dlat
    -- PARTITION Pruning and bounding box
                AND lon BETWEEN @west_lon - @dlon
                    AND @west_lon + @dlon    -- first part of PK
                AND ", _condition, "
            HAVING dist <= ", _max_dist, " )
            UNION ALL
            ( SELECT *,
                @deg2dist * GCDist(@my_lat, @east_lon, lat, lon) AS dist
            FROM cities6
            WHERE lat BETWEEN @my_lat - @dlat
                AND @my_lat + @dlat
    -- PARTITION Pruning and bounding box
                AND lon BETWEEN @east_lon - @dlon
                    AND @east_lon + @dlon    -- first part of PK
                AND ", _condition, "
            HAVING dist <= ", _max_dist, " )
            ORDER BY dist
            LIMIT ", _limit
                );
        PREPARE _sql FROM @sql;
        EXECUTE _sql;
        DEALLOCATE PREPARE _sql;
    END IF;
END;
//
DELIMITER ;
```

While the example provided here is in MySQL®, it should be understood that this is intended to be illustrative only and that any suitable routine, in combination with any other hardware or software, may be used to implement the illustrated method and system. The disclosed method may apply to any data set including two or more dimensions.

The disclosed computer implemented method may be stored in computer-readable storage medium. The computer-readable storage medium is accessible to at least one processor. The processor is configured to implement the stored instructions to search the database.

From the foregoing, it can be seen that the present embodiments provide an efficient solution to search a database. The disclosed embodiments stores data in different partitions and search the nearest partitions within a preset distance to the starting point. In some embodiments, data rows are clustered together on disk, permitting faster data access, and reduced latency for end users. The search may need to span more than one partition, then there could be more than one set of block(s). However, this does not nullify the performance advantage.

Disk I/O is often the most important part of a database query. The method may be used in cases that the data is too big, and too randomly accessed, to fit in a RAM cache. On the other hand, even if the data does fit, the data organization and method will require less CPU cycles to search the database. Although the examples are about finding the N nearest objects to a starting point, the disclosed methods and systems may be used to search databases storing other types of data.

The disclosed method and system may be implemented partly in a server, a client device, a cloud computing environment, partially in a sever and partially in a client device, or a combination of the server, the cloud computing environment and the client device.

It is therefore intended that the foregoing detailed description be regarded as illustrative rather than limiting, and that it be understood that it is the following claims, including all equivalents, that are intended to define the spirit and scope of this invention.

What is claimed is:

1. A non-transitory storage medium configured to store a database, comprising:
   a first table of records, the first table of records including
      a data object comprising:
         a first data object attribute associated with a first coordinate in a first dimension along a first geographic reference coordinate;
         a second data object attribute associated with a first coordinate in a second dimension along a second geographic reference coordinate; and
         a third data object attribute that includes identification information of the data object;
      wherein a first primary key of the first table combines the first data object attribute, the second data object attribute, and the third data object attribute;
      wherein the first table of records includes a plurality of data objects partitioned into a plurality of data partitions corresponding to ranges of coordinate offsets along the first dimension; and a second table of records comprising:
a second primary key comprising matching identification information corresponding to the third data object attribute and further comprising location based information related to at least one of the first coordinate in the first dimension associated with the first data object attribute or the first coordinate in the second dimension associated with the second data object attribute.

2. The non-transitory storage medium of claim 1, wherein the second table of records includes location-based services (LBS) information to be displayed on a display screen.

3. The non-transitory storage medium of claim 2, wherein the first dimension comprises latitude.

4. The non-transitory storage medium of claim 1, wherein at least one record of a first partition of the first table is selected for storage in a disk block based upon a first index in the second dimension.

5. The non-transitory storage medium of claim 1, wherein the first dimension is one of a latitude, a longitude, or a distance from a reference location.

6. The non-transitory storage medium of claim 1, wherein the first primary key begins with the coordinate in the second dimension.

7. A computing device comprising a processor configured to:
receive a request to access a database comprising a first table of records and a second table of records, wherein the request comprises a query term and a starting location, the first table of records including a data object comprising: a first data object attribute associated with a first coordinate in a first dimension along a first geographic reference coordinate, a second data object attribute associated with a first coordinate in a second dimension along a second geographic reference coordinate, and a third data object attribute that includes identification information of the data object, wherein the first table of records includes a plurality of data objects partitioned into a plurality of data partitions corresponding to ranges of coordinate offsets along the first dimension;
select, from the plurality of data partitions included in the first table of records, a data partition within a first offset to a coordinate along the first dimension identified in the starting location; and
select, from the selected data partition, a first number of first records identifying location based information related to the query term and corresponding to a location within a second offset to a coordinate along the second dimension identified in the starting location,
wherein a first primary key of the first table of records combines the first data object attribute, the second data object attribute, and the third data object attribute; and
wherein the second table of records comprises a second primary key comprising matching identification information corresponding to the third data object attribute and further comprising location based information related to at least one of the first coordinate in the first dimension associated with the first data object attribute or the first coordinate in the second dimension associated with the second data object attribute.

8. The computing device of claim 7, wherein the second table of records includes location-based services (LBS) information to be displayed on a display screen.

9. The computing device of claim 8, wherein the processor is configured to select, from the second table of records, a second number of second data records based on the first number of first records selected from the first table of records.

10. The computing device of claim 7, wherein at least one record of a first partition of the first table is selected for storage in a disk block based upon a first index in the second dimension.

11. The computing device of claim 7, wherein the processor is configured to increase at least one of the first and second offsets and repeat the selections when the first number of first records is less than a preset number.

12. The computing device of claim 7, wherein the first primary key starts with the coordinate in the second dimension.

13. The computing device of claim 3, wherein the first dimension is one of a latitude, a longitude, or a distance from a reference location.

14. A computer implemented method, comprising:
receiving, by a processor, a request to access a database comprising a first table of records and a second table of records, wherein the request comprises query term and a starting location, the first table of records including a data object comprising: a first data object attribute associated with a first coordinate in a first dimension along a first geographic reference coordinate, a second data object attribute associated with a first coordinate in a second dimension along a second geographic reference coordinate, and a third data object attribute that includes identification information of the data object, wherein the first table of records includes a plurality of data objects partitioned into a plurality of data partitions corresponding to ranges of coordinate offsets along the first dimension;
selecting, by the processor, a data partition from the plurality of data partitions included in the first table of records within a first offset to a coordinate along the first dimension identified in the starting location; and
selecting, from the selected data partition, a first number of first records identifying location based information related to the query term and corresponding to a location within a second offset to a coordinate along the second dimension identified in the starting location,
wherein a first primary key of the first table of records combines the first data object attribute, the second data object attribute, and the third data object attribute; and
wherein the second table of records comprises a second primary key comprising matching identification information corresponding to the third data object attribute and further comprising location based information related to at least one of the first coordinate in the first dimension associated with the first data object attribute or the first coordinate in the second dimension associated with the second data object attribute.

15. The method of claim 14, wherein the second table of records includes location-based services (LBS) information to be displayed on a display screen.

16. The method of claim 15, further comprising selecting, from the second table of records, a second number of second data records based on the first number of first records selected from the first table of records.

17. The method of claim 14, further comprising increasing at least one of the first and second offsets and repeat the selections when the first number of first records is less than a preset number.

18. The method of claim 14, wherein the first dimension is one of a latitude, a longitude, or a distance from a reference location.

\* \* \* \* \*